(12) United States Patent  
Jimenez

(10) Patent No.: US 9,174,745 B1
(45) Date of Patent: Nov. 3, 2015

(54) PERFORMANCE-BASED METHOD AND SYSTEM FOR CHECKING THE FUEL QUANTITY OF A VEHICLE

(71) Applicant: Michael A. Jimenez, Marion, IA (US)

(72) Inventor: Michael A. Jimenez, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/291,529

(22) Filed: May 30, 2014

(51) Int. Cl.
*G01C 5/00* (2006.01)
*B64D 45/00* (2006.01)

(52) U.S. Cl.
CPC ..................................... *B64D 45/00* (2013.01)

(58) Field of Classification Search
CPC ............................. G01C 23/005; B64C 19/00
USPC ............................................ 701/3, 9, 14, 15
See application file for complete search history.

(56) References Cited

U.S. PATENT DOCUMENTS

| 4,837,695 A | 6/1989 | Baldwin |
| 6,812,858 B2 * | 11/2004 | Griffin, III ..................... 340/945 |
| 8,467,918 B2 * | 6/2013 | Lieu ................................ 701/14 |
| 2014/0005861 A1 * | 1/2014 | Mere et al. ........................ 701/3 |

* cited by examiner

*Primary Examiner* — Russell Frejd
*Assistant Examiner* — Luke Huynh
(74) *Attorney, Agent, or Firm* — Angel N. Gerdzhikov; Donna P. Suchy; Daniel M. Barbieri

(57) ABSTRACT

A system and method for checking the fuel quantity of a vehicle based on vehicle performance includes predicting vehicle performance based from a number of vehicle related input parameters including assumed fuel quantity to provide predicted vehicle performance data. Actual vehicle performance is measured from a number of vehicle sensor systems to provide measured actual vehicle performance data. The predicted vehicle performance data is compared with the measured actual vehicle performance data to provide an indication as to whether the vehicle is operating within a selected tolerance of the prediction. An alert message is provided if the vehicle is determined to be operating outside of the selected tolerance of prediction.

20 Claims, 3 Drawing Sheets

PERFORMANCE-BASED METHOD AND SYSTEM FOR CHECKING THE FUEL QUANTITY OF A VEHICLE

BACKGROUND OF THE INVENTION

1. Field of the Invention

The present invention relates generally to fuel quantity indicators for vehicles, and more particularly to systems and methods for checking the fuel quantity of a vehicle based on vehicle performance.

2. Description of the Related Art

In the event of an aircraft being dispatched without operational fuel quantity indicators, the aircraft's total fuel quantity is calculated via the "known" amount of fuel in the tanks at the beginning of the flight (calculated by ground personnel and confirmed by the flight crew) and then decremented by onboard computers (such as the flight management system (FMS)) as fuel is burned in-flight. Although this system is typically very accurate, it is fully dependent upon being correctly initialized with the proper information.

A well-known example of improper initialization is illustrated by the case of the "Gimli Glider," the nickname of an Air Canada aircraft that was involved in an unusual aviation incident in 1983. In Air Canada flight 143, the state-of-the-art Boeing 767 aircraft ran out of fuel while at cruise due to a clerical error in kg/lb unit conversions, resulting in the aircraft only being filled with less than half the required amount of fuel needed for the flight. The aircraft was supposed to take 22,300 kg of fuel. However, it was filled with 22,300 lbs instead (less than half of the required amount). Due to this particular aircraft's fuel quantity indicators being inoperable, there was no indication of this fuel shortage. Since the FMS had been programmed with the assumed (yet incorrect) quantity that the aircraft should have been filled with, everything appeared normal to the crew with no indication that the aircraft was flying with almost 27,000 pounds of fuel absent. Performance characteristics depend significantly on the gross weight (and center of gravity) of the aircraft. In the example Air Canada incident, the aircraft would have taken off with approximately a 7-10% lighter gross weight than intended, with a displaced center of gravity. This would have resulted in significant takeoff and climb performance deltas from those expected, in addition to different trim settings needed for cruise.

There has been a partial response to this problem. U.S. Pat. No. 8,467,918 B2, issued to Lieu entitled, "HEURISTIC METHOD FOR COMPUTING PERFORMANCE OF AN AIRCRAFT," discloses a method for estimating the vertical airspeed and fuel flow of an aircraft at a point along a flight plan using other aircraft parameters for that point. The process uses a database having entries containing sets of actual values of operating parameters obtained during prior aircraft flights. The database is sorted by data set aggregate values that are is calculated from each set of actual values. When the vertical airspeed and fuel flow estimates are needed, a section thereof is identified based on the aggregate values. That section of the database is analyzed to identify the set of actual operating parameters values that best matches the other aircraft parameters for the flight plan point. The vertical airspeed and fuel flow values from that identified set are used as the estimates. The process reduces the amount of the database that has to be analyzed to locate the data to use.

U.S. Pat. No. 4,837,695, issued to Baldwin, entitled, "METHOD AND APPARATUS FOR PREDICTING AND MONITORING AIRCRAFT TAKEOFF PERFORMANCE," discloses a method for predicting and monitoring the takeoff performance of an aircraft uses information from one or more previous takeoffs of the aircraft to generate a prediction of the takeoff performance for the current takeoff. In the preferred embodiment, a takeoff profile for the current takeoff is generated and includes information about predetermined characteristics of the aircraft and information about ambient conditions at an airport from which the takeoff is being monitored. Expected performance data for the current takeoff is then generated from the takeoff profile and used to select a set of actual performance data previously stored from the one or more previous takeoffs. A selected "best fit" actual performance data set is then displayed in an appropriate fashion. Upon takeoff, a set of monitored performance data is generated as a function of one or more of sensed takeoff parameters. The monitored performance data set for the current takeoff is then displayed in conjunction with the actual performance data previously selected to provide the crew with an indication of the progress of the current takeoff.

Both of the above patents disclose methods for observing and predicting the performance of an aircraft; however, neither method uses the observed performance as a means of checking for an error in the data used to make the prediction. An error that is particularly of interest is a discrepancy in fuel quantity, and this will be the focus of the method as described herein.

SUMMARY OF THE INVENTION

In a broad aspect, the present invention is a method for checking the fuel quantity of a vehicle based on vehicle performance. The method includes predicting vehicle performance based from a number of vehicle related input parameters, including assumed fuel quantity to provide predicted vehicle performance data. Actual vehicle performance is measured from a number of vehicle sensor systems to provide measured actual vehicle performance data. The predicted vehicle performance data is compared with the measured actual vehicle performance data to provide an indication as to whether the vehicle is operating within a selected tolerance of the prediction. An alert message is provided if the vehicle is determined to be operating outside of the selected tolerance of prediction.

In one preferred embodiment, the vehicle is an aircraft and the number of vehicle related input parameters is selected from the group of aircraft related input parameters consisting of: aircraft zero fuel weight, aircraft configuration, center of gravity, and environmental data.

In a preferred embodiment, the vehicle is an aircraft and the number of vehicle sensor systems is selected from the group of aircraft sensor systems consisting of: air data sensors, navigation sensors, flight control sensors, and engine sensors.

In a preferred embodiment, the vehicle is an aircraft and the predicted vehicle performance data and the measured vehicle performance data is selected from the group of aircraft performance data consisting of: elapsed time, fuel consumed, distance traveled, airspeed, climb rate, and trim position.

In another broad aspect the present invention is a flight management system for an aircraft vehicle. The flight management computer is configured to:

i) predict vehicle performance based from a number of vehicle related input parameters including assumed fuel quantity to provide predicted vehicle performance data;

ii) measure actual vehicle performance from a number of vehicle sensor systems to provide measured actual vehicle performance data;

iii) compare the predicted vehicle performance data with the measured actual vehicle performance data to provide an indication as to whether the vehicle is operating within a selected tolerance of the prediction; and, iv) provide an alert message if the vehicle is determined to be operating outside of the selected tolerance of prediction.

In another broad aspect the present invention is a method for checking the fuel quantity of a vehicle based on vehicle performance which includes the steps of:

a) comparing a predicted vehicle performance data based on vehicle related input parameters including assumed fuel quantity and a measured vehicle performance data based on input from vehicle sensor systems; and, b) providing an alert indicative of an assumed fuel quantity error to a user in response to the predicted vehicle performance data and the measured vehicle performance data differing from one another by a predetermined threshold.

Other objects, advantages, and novel features will become apparent from the following detailed description of the invention when considered in conjunction with the accompanying drawings.

DETAILED DESCRIPTION OF THE INVENTION

Figure 1:
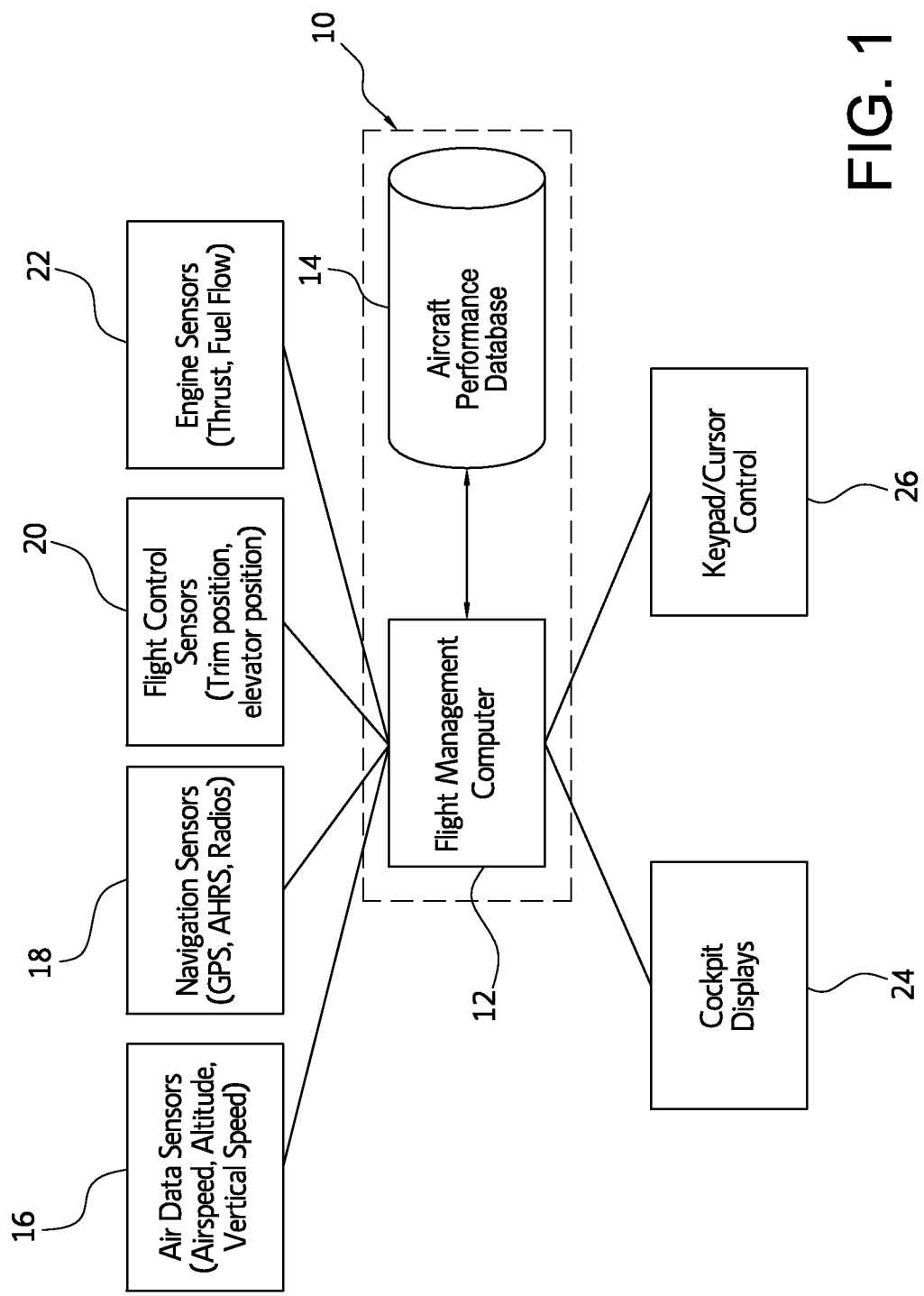
FIG. 1 is a block schematic diagram of a flight management system of an aircraft embodying the principles of the present invention.

Referring now to the drawings and the characters of reference marked thereon, FIG. 1 illustrates a flight management system, designated generally as 10, for an aircraft in accordance with the principles of the present invention. The flight management system 10 includes a flight management computer 12 and an aircraft performance database 14. The flight management computer 12 is configured to receive input from various vehicle sensor systems, for example, air data sensors 16, navigation sensors 18, flight control sensors 20, and engine sensors 22.

The flight management computer 12 includes a central processing unit (CPU). The CPU executes software that implements the flight management of the aircraft with which the flight management computer 12 is used. The software instructions for governing the operation of the flight management computer 12, data specifying operational capabilities of the aircraft, and other control data received and produced by the FMS are stored in a memory. The memory may include one or more of a random access memory, a CD-ROM, a hard disk and other types of storage devices known in the field. An input/output (I/O) circuit interfaces the CPU with the various vehicle sensor systems.

The air data sensors 16 typically measure indicated (forward) airspeed, altitude, and vertical airspeed of the aircraft. The navigation sensors 18 calculate actual or relative position of the aircraft using any number of navigational methods including Global Positioning System (GPS), Attitude and Heading Reference System (AHRS), VHF Omnidirectional Range (VOR), Distance Measuring Equipment (DME), or Non-Directional Beacon (NDB). The flight control sensors 20 provide positional information of the aircraft's flight control surfaces, including elevator position, aileron position, rudder position, and elevator trim position. The engine sensors 22 detect operating parameters of the aircraft engines.

The aircraft interfaces with the flight management system 10 via cockpit displays 24 and a keypad/cursor control 26. The keypad/cursor control 26 can be employed to enter the aircraft flight plan into the FMS 10 and the cockpit displays 24 provide a visual depiction of the flight plan during air travel. Additional input/output devices may be provided to permit the flight crew to input data and commands into and receive information from the FMS 10.

The FMS 10 may be one of several models available from Rockwell Collins, Inc., Cedar Rapids, Iowa, for example. The FMS is augmented with additional software to implement the present method for checking the fuel quantity of an aircraft based on aircraft performance, as is described hereinafter.

Figure 2:
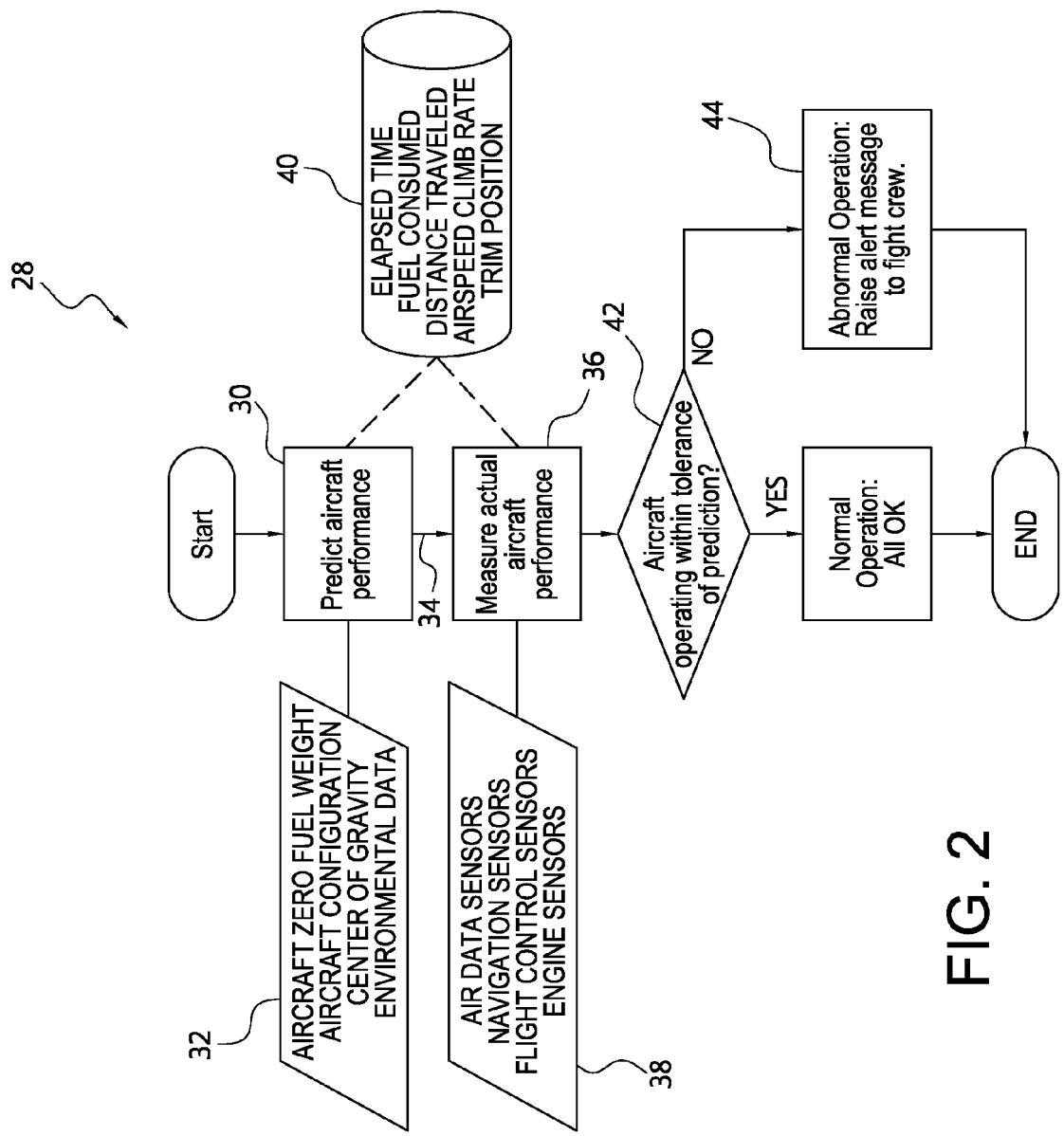
FIG. 2 is a flowchart of a method for checking the fuel quantity of a vehicle based on vehicle performance, in accordance with an aspect of the present invention.

Referring now to FIG. 2, in a first step of operation the FMS executes the routine 28 shown to check the fuel quantity during flight. Predicted vehicle performance (as shown by block 30) based from a plurality of vehicle related input parameters 32 is predicted, as indicated by including assumed fuel quantity to provide predicted vehicle performance data 34. The term "assumed fuel quantity" refers to the fuel quantity (measured by weight) entered into the system by the crew but may not correctly represent the actual fuel quantity present in the vehicle's fuel tanks. The error between actual fuel quantity and assumed fuel quantity may be due to human error, such as a miscalculation; and/or a system error, such as a malfunctioning fuel quantity indicator. The term "predicted vehicle performance" refers to the calculations made by the FMS to predict the vehicle's trajectory, for example including rate of climb, rate of acceleration, distance traveled, and altitude achieved.

A multitude of methods currently exist to perform this kind of predicting. One common method is to utilize an aircraft performance database 14. This type of database exists within an aircraft's FMS and contains manufacturer-specific performance parameters to be returned as the result of an input query containing the vehicle related input parameters discussed earlier. Alternatively, a method may be employed within the FMS utilizing "first principles" aerospace equations to calculate these same performance parameters. Lastly, performance parameters may also be predicted based on previously observed and/or learned aircraft behavior.

U.S. Pat. Nos. 8,467,918 B2 and 4,837,695, discussed above, are incorporated by reference herein, in their entireties, as showing examples as to how the aircraft performance can be predicted based on observed and/or learned aircraft behavior.

The plurality of vehicle related input parameters 32 is selected from the group of aircraft related input parameters consisting of: aircraft zero fuel weight, assumed fuel quantity, aircraft configuration, center of gravity, and environmental data. Zero fuel weight is the weight of the entire aircraft minus the onboard fuel quantity: this includes basic empty weight, cargo weight, passenger weight, and crew weight. The assumed fuel quantity (measured by weight), discussed earlier, is then added to the zero fuel weight to form an assumed gross weight of the aircraft. Aircraft configuration refers to selectable configurations that an aircraft may be operated within, the details of which vary between models. Some examples include flap/slat position, selected engine thrust mode, selected engine bleed setting, and APU running status. Center of gravity is commonly calculated based on averaging the weighted relative longitudinal locations of each item of the aircraft and its contents. Lastly, environmental data consists of atmospheric and geographical data that may affect vehicle performance. This may include ambient temperature, barometric pressure, wind speeds, runway slope, or other terrain considerations.

Actual vehicle performance (block 36) is measured from the plurality of vehicle sensor systems, collectively designated by block 38, to provide measured actual vehicle performance data. These sensor systems already exist onboard most aircraft; and include air data sensors, navigation sensors, flight control sensors, and engine sensors—each of which has been discussed earlier.

The predicted vehicle performance data and the measured vehicle performance data may be, for example, aircraft performance data including, for example, elapsed time, fuel consumed, distance traveled, airspeed, climb rate, and trim position (see numeral designation 40).

Figure 3:
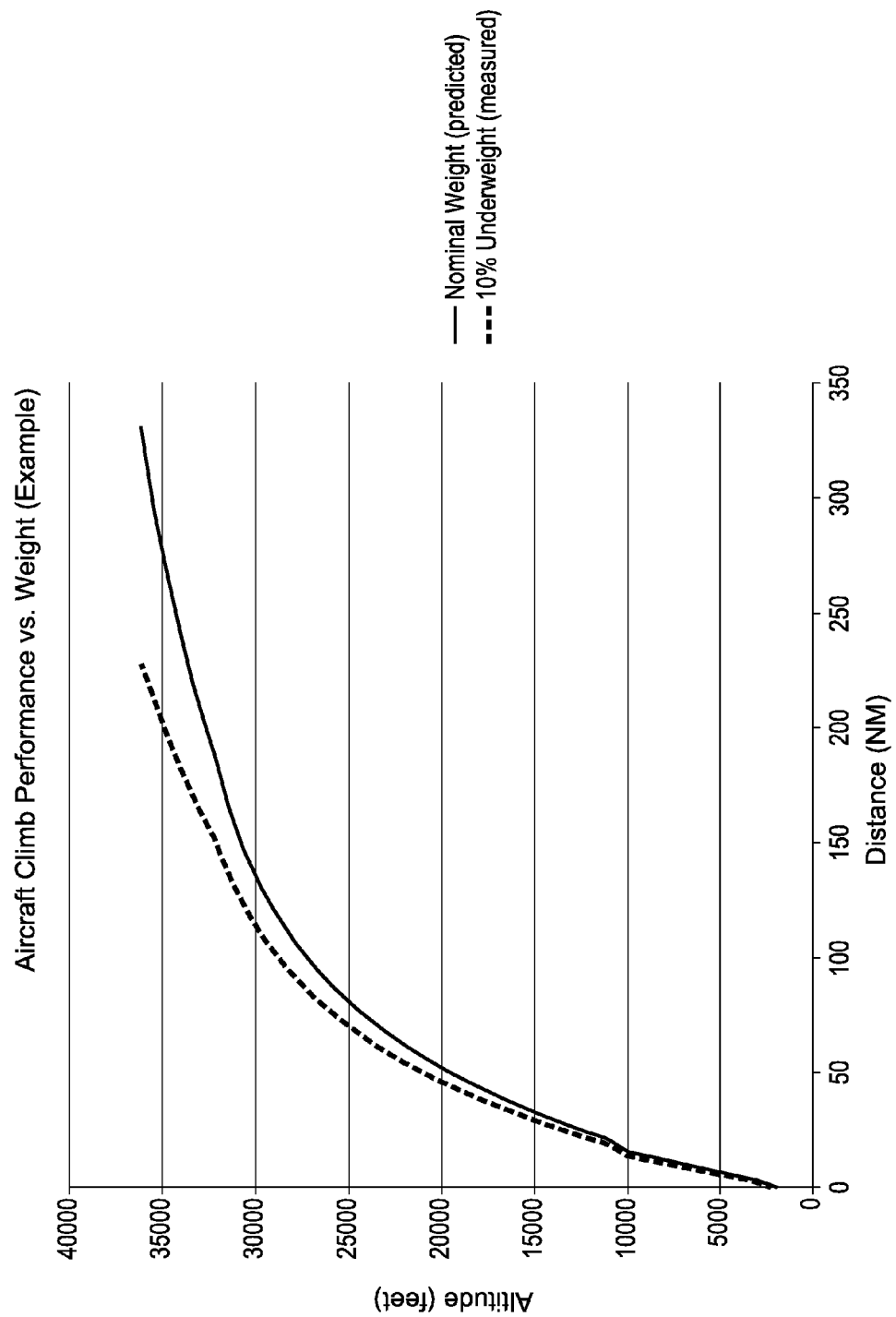
FIG. 3 is a graph depicting the trajectory of an aircraft in two similar situations; one with a nominal "assumed" gross weight, and the other with a 10% reduction in weight from the nominal case.

The predicted vehicle performance data is compared with the measured actual vehicle performance data to provide an indication as to whether the vehicle is operating within a selected tolerance of the prediction (block 42). An example is provided in FIG. 3, which depicts two trajectories of an aircraft's climb to 36,000 feet: One at a nominal gross weight (the "predicted" trajectory), and the other with a 10% reduction in gross weight (the "measured" trajectory), simulating the kind of discrepancy this method is intended to detect. In this example, it can be seen that the under-weight aircraft reaches its cruising altitude around 100 miles earlier (~33%) than it would have if it were actually operating at the assumed weight. This represents a significant delta that an FMS would easily be able to detect if it were programmed with the appropriate methods as described in this patent application.

Referring again to FIG. 2, an alert message is provided if the vehicle is determined to be operating outside of the selected tolerance of prediction (block 44). This tolerance would be carefully chosen so as to minimize the potential of the system raising a nuisance alert. An example alert message would be part of an aircraft's Crew Alerting System (CAS) and invoke a Master Caution alarm, with aural and/or textual alerts indicating that the aircraft appears to be under its planned weight, potentially due to a fuel shortage. An example textual alert would be "UNDERWEIGHT SUSPECT." Proper training of the flight crew, along with diagnostic information and checklists found in the aircraft's Quick Reference Handbook (QRH), would provide a series of actions for the flight crew to detect the problem and take corrective action.

Thus, in summary, in accordance with the present invention, aircraft performance and stabilizer trim is monitored by the FMS and compared against expected performance with the given weight and other input parameters. If the aircraft is exceeding these performance expectations by a specified margin, it triggers an alert to the pilot, essentially stating that aircraft performance is "too good to be true" and therefore a weight calculation must be incorrect. This forces the crew to re-examine their weight data, and hopefully either find an error or divert to re-inspect their fuel loading, avoiding a potentially catastrophic event.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link (e.g., transmitter, receiver, transmission logic, reception logic, etc.), etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Other embodiments and configurations may be devised without departing from the spirit of the invention and the scope of the appended claims.

The invention claimed is:

1. A method for checking the fuel quantity of a vehicle based on vehicle performance, comprising the steps of:
   a) predicting vehicle performance based from a plurality of vehicle related input parameters including assumed fuel quantity to provide predicted vehicle performance data;

b) measuring actual vehicle performance from a plurality of vehicle sensor systems to provide measured actual vehicle performance data;

c) comparing said predicted vehicle performance data with said measured actual vehicle performance data to provide an indication as to whether the vehicle is operating within a selected tolerance of the prediction; and, d) providing an alert message if the vehicle is determined to be operating outside of said selected tolerance of prediction.

2. The method of claim 1, wherein said vehicle is an aircraft.

3. The method of claim 1, wherein said vehicle is an aircraft and said plurality of vehicle related input parameters includes at least one of: aircraft zero fuel weight, aircraft configuration, center of gravity, and environmental data.

4. The method of claim 1, wherein said vehicle is an aircraft and said plurality of vehicle sensor systems includes at least one of: air data sensors, navigation sensors, flight control sensors, and engine sensors.

5. The method of claim 1, wherein said vehicle is an aircraft and said predicted vehicle performance data and said measured actual vehicle performance data includes at least one of: elapsed time, fuel consumed, distance traveled, airspeed, climb rate, and trim position.

6. The method of claim 1, wherein said step of predicting vehicle performance comprises utilizing an aircraft performance database.

7. The method of claim 1, wherein said step of predicting vehicle performance comprises utilizing first principles aerospace equations.

8. The method of claim 1, wherein said step of predicting vehicle performance comprises utilizing observed or learned aircraft behavior.

9. A flight management system for an aircraft vehicle, comprising:

a) a flight management computer configured to:
  i) predict vehicle performance based from a plurality of vehicle related input parameters including assumed fuel quantity to provide predicted vehicle performance data;
  ii) measure actual vehicle performance from a plurality of vehicle sensor systems to provide measured actual vehicle performance data;
  iii) compare said predicted vehicle performance data with said measured actual vehicle performance data to provide an indication as to whether the vehicle is operating within a selected tolerance of the prediction; and,
  iv) provide an alert message if the vehicle is determined to be operating outside of said selected tolerance of prediction; and, b) an aircraft performance database operatively connected to said flight management computer for providing input to predict said vehicle performance.

10. The flight management system of claim 9, wherein said plurality of vehicle related input parameters includes at least one of: aircraft zero fuel weight, aircraft configuration, center of gravity, and environmental data.

11. The flight management system of claim 9, said plurality of vehicle sensor systems includes at least one of: air data sensors, navigation sensors, flight control sensors, and engine sensors.

12. The flight management system of claim 9, said vehicle is an aircraft and said predicted vehicle performance data and said measured vehicle performance data includes at least one of: elapsed time, fuel consumed, distance traveled, airspeed, climb rate, and trim position.

13. The flight management system of claim 9, said predicted vehicle performance data comprises observed or learned aircraft behavior.

14. A method for checking the fuel quantity of a vehicle based on vehicle performance, comprising the steps of:

a) comparing a predicted vehicle performance data based on a plurality of vehicle related input parameters including assumed fuel quantity and a measured vehicle performance data based on input from a plurality of vehicle sensor systems; and, b) providing an alert indicative of an assumed fuel quantity error to a user in response to the predicted vehicle performance data and the measured vehicle performance data differing from one another by a predetermined threshold.

15. The method of claim 14, wherein said vehicle is an aircraft.

16. The method of claim 14, wherein said vehicle is an aircraft and said plurality of vehicle related input parameters includes at least one of: aircraft zero fuel weight, aircraft configuration, center of gravity, and environmental data.

17. The method of claim 14, wherein said vehicle is an aircraft and said plurality of vehicle sensor systems includes at least one of: air data sensors, navigation sensors, flight control sensors, and engine sensors.

18. The method of claim 14, wherein said vehicle is an aircraft and said predicted vehicle performance data and said measured vehicle performance data includes at least one of: elapsed time, fuel consumed, distance traveled, airspeed, climb rate, and trim position.

19. The method of claim 14, wherein said step of comparing a predicted vehicle performance data based on a plurality of vehicle related input parameters comprises utilizing an aircraft performance database.

20. The method of claim 14, wherein said step of comparing a predicted vehicle performance data based on a plurality of vehicle related input parameters comprises utilizing first principles aerospace equations.

* * * * *